(12) United States Patent
Lim (10) Patent No.: US 11,655,917 B2
(45) Date of Patent: May 23, 2023

(54) PIPE VIBRATION-PROOF CHANNEL

(71) Applicant: GNI. Co., Ltd., Hwaseong-si (KR)

(72) Inventor: Chang Su Lim, Hwaseong-si (KR)

(73) Assignee: GNI. CO., Ltd.

( * ) Notice: Subject to any disclaimer, the term of this patent is extended or adjusted under 35 U.S.C. 154(b) by 0 days.

(21) Appl. No.: 17/687,512

(22) Filed: Mar. 4, 2022

(65) Prior Publication Data

US 2023/0129103 A1    Apr. 27, 2023

(30) Foreign Application Priority Data

Oct. 27, 2021   (KR) .................. 10-2021-0144275

(51) Int. Cl.
*F16L 3/04*    (2006.01)
*F16L 3/14*    (2006.01)
*F16L 3/237*   (2006.01)

(52) U.S. Cl.
CPC ............. *F16L 3/04* (2013.01); *F16L 3/14* (2013.01); *F16L 3/237* (2013.01)

(58) Field of Classification Search
CPC ... F16L 3/004; F16L 3/14; F16L 3/237; F16L 3/24; F16L 3/245; F16B 2/02; F16B 2/06
USPC .................. 248/71–72, 228.3, 228.6, 228.1
See application file for complete search history.

(56) References Cited

U.S. PATENT DOCUMENTS

| 3,572,623 | A  | * | 3/1971  | Lapp ................. | F16B 2/065 248/72 |
| 3,960,350 | A  | * | 6/1976  | Tardoskegyi ........ | F16L 3/26 248/68.1 |
| 6,254,040 | B1 | * | 7/2001  | McGrath ............ | F16L 3/24 248/62 |
| 7,281,695 | B2 | * | 10/2007 | Jordan .............. | F16B 2/065 248/65 |
| 7,891,618 | B2 | * | 2/2011  | Carnevali .......... | A47B 21/0314 248/228.6 |
| 2018/0087692 | A1 | * | 3/2018  | Geiger ............. | F16L 3/04 |
| 2020/0003351 | A1 | * | 1/2020  | Bootsveld .......... | F16L 3/1008 |
| 2020/0347962 | A1 | * | 11/2020 | Smith .............. | F16L 3/04 |

FOREIGN PATENT DOCUMENTS

KR    20090119065 A    11/2009

* cited by examiner

*Primary Examiner* — Christopher Garft
(74) *Attorney, Agent, or Firm* — Renaissance IP Law Group LLP (57) ABSTRACT

Disclosed is a pipe vibration-proof channel capable of preventing vibration generated in a pipe from being transferred to the outside. Here, since a vertical channel connected to a horizontal channel on which the pipe is disposed is disposed to be separated from a structural section steel member, it is possible to prevent the vibration generated in the pipe from being transferred to the structural section steel member. Also, since a vibration-proof unit capable of absorbing the vibration of the pipe is disposed on a pipe fixing portion configured to fix a vibration-proof bracket and the pipe, it is possible to prevent the vibration of the pipe from being transferred to the vertical channel.

9 Claims, 8 Drawing Sheets

PIPE VIBRATION-PROOF CHANNEL

CLAIM FOR PRIORITY

This application claims priority to Korean Patent Application No. 2021-0144275 filed Oct. 27, 2021 in the Korean Intellectual Property Office (KIPO), the entire contents of which are hereby incorporated by reference.

BACKGROUND

1. Technical Field

Example embodiments of the present disclosure relate in general to a pipe vibration-proof channel, and more particularly, to a pipe vibration-proof channel capable of preventing vibration generated in a pipe from being transferred to the outside.

2. Related Art

Structures of industrial facilities are generally constructed with structural molten steel such as H-beams, and H-beams are disposed below a ceiling of an industrial facility, that is, a grating on which facility equipment is disposed. Also, a variety of wires, pipes, or the like connected to the facility equipment are disposed above the ground with a height using channels connected to an H-beam.

Figure 1:
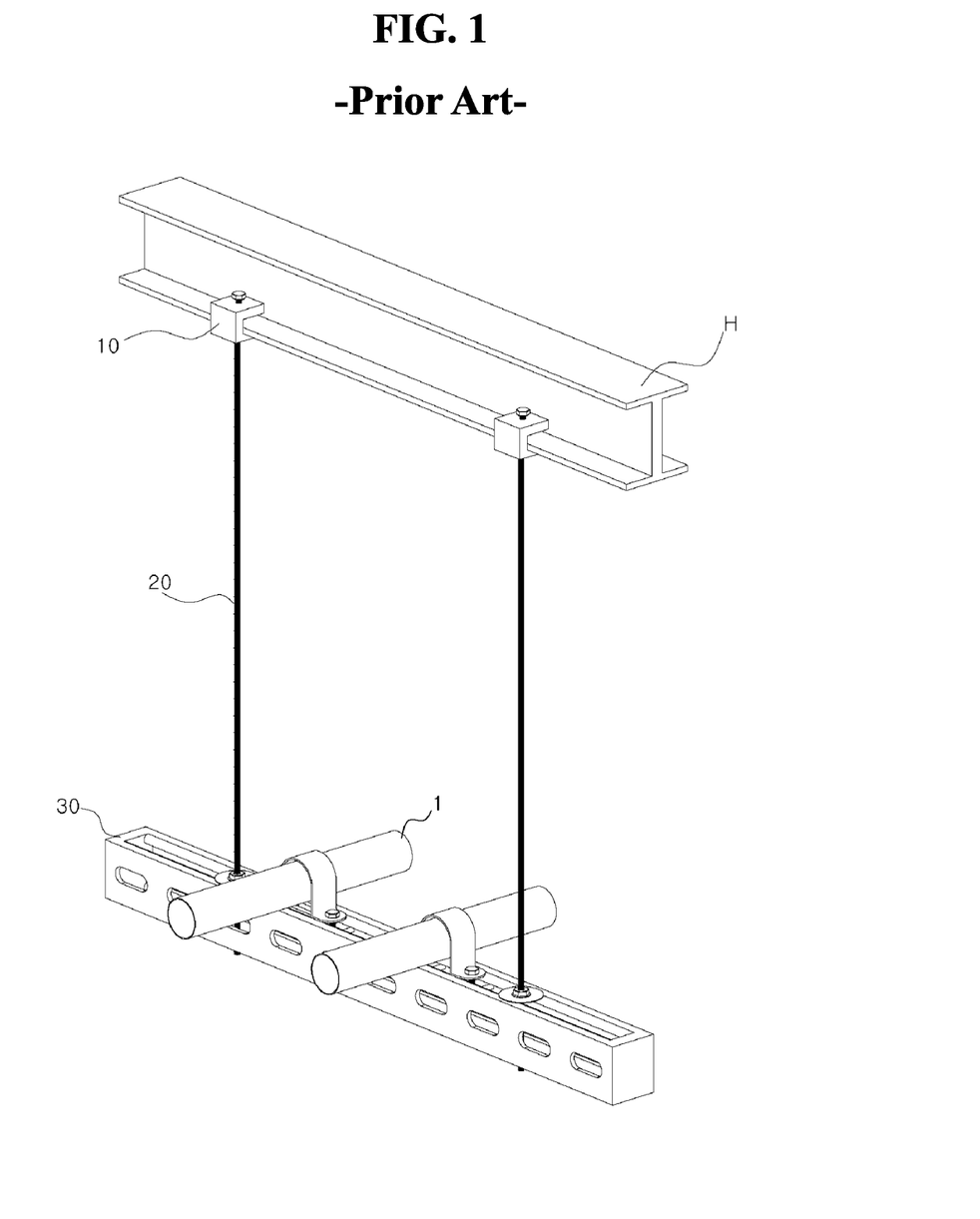
FIG. 1 is a view illustrating a conventional pipe channel.

FIG. 1 is a view illustrating a conventional pipe channel.

Referring to FIG. 1, the conventional pipe channel has a structure in which a bracket 10 for fixing is fixed to an H-beam using a bolt, and a vertical channel 20 and a horizontal channel 30 are connected to a lower side of the bracket 10 to fix the pipe channel to the H-beam. A wire or a pipe 1 is fixedly disposed on the horizontal channel 30 above the ground with a height.

However, in the pipe 1, vibration is generated due to water or gases flowing in the pipe 1. The vibration generated in the pipe 1 is transferred to the pipe channel and transferred to a grating, on which facility equipment is disposed, through the H-beam.

Accordingly, due to the vibration generated in the pipe 1, a problem may occur that cracks occur in the pipe 1 or fixing bolts and the like installed on overall industrial facilities such as the H-beam, the facility equipment, and the like are released. Furthermore, in industrial facilities in which micro processes such as semiconductor manufacturing processes are required, since even micro vibration may have a bad influence on final products, a vibration-proof structure capable of preventing the vibration generated in wires or the pipe 1 from being transferred to the outside is required.

SUMMARY

Accordingly, example embodiments of the present inventive concept are provided to substantially obviate one or more problems due to limitations and disadvantages of the related art.

Example embodiments of the present inventive concept provide a pipe vibration-proof channel capable of preventing vibration generated in a pipe from being transferred to the outside.

In some example embodiments, a pipe vibration-proof channel includes a plurality of vibration-proof brackets coupled to a flange portion of a structural section steel member, a vertical channel having one end connected to each of the plurality of vibration-proof brackets, a horizontal channel connected to the other end of the vertical channel, and a pipe fixing portion disposed above the horizontal channel to fix a pipe thereto. Here, the vertical channel is connected to the vibration-proof bracket to be separated from the structural section steel member.

The vibration-proof bracket may include a fixing portion coupled to the structural section steel member, a connection portion disposed apart from the fixing portion and to which the vertical channel is coupled, and an extension portion formed to extend to the connection portion from the fixing portion.

The pipe vibration-proof channel may further include a first vibration-proof unit disposed above the connection portion, a second vibration-proof unit disposed below the connection portion, and a packing disposed at a part where the connection portion and the vertical channel are coupled to each other.

The first vibration-proof unit may include a first vibration-proof member disposed in contact with an upper surface of the connection portion and a first vibration-proof block disposed to surround an upper surface of the first vibration-proof member and to be spaced apart from the extension portion.

The second vibration-proof unit may include a second vibration-proof member disposed in contact with a lower surface of the connection portion and a second vibration-proof block disposed to surround a lower surface of the second vibration-proof member.

One end of the vertical channel may be connected to the connection portion, and the connected one end of the vertical channel may be disposed apart from the fixing portion.

The pipe fixing portion may include a pipe bracket disposed to surround the pipe and fixed to the horizontal channel and a third vibration-proof unit disposed between the pipe and the horizontal channel to allow the pipe and the horizontal channel to be spaced apart from each other.

The pipe bracket may further include a buffer portion formed in contact with an outer circumferential surface of the pipe.

The third vibration-proof unit may include a third vibration-proof member on which the pipe is seated and a third vibration-proof block disposed above the horizontal channel and including a seat groove on which the third vibration-proof member is seated.

The pipe vibration-proof channel may further include a fourth vibration-proof unit disposed on a part where the structural section steel member and the fixing portion are coupled.

The fourth vibration-proof unit may include a fourth vibration-proof member disposed between a lower surface of the structural section steel member and the fixing portion, a fifth vibration-proof member disposed between a side surface of the structural section steel member and the fixing portion, a sixth vibration-proof member disposed between an upper surface of the structural section steel member and the fixing portion, and a fourth vibration-proof block disposed to surround an upper surface of the fifth vibration-proof member.

The fourth vibration-proof block may pressurize the sixth vibration-proof member due to a fixing bolt configured to fix the fixing portion.

BRIEF DESCRIPTION OF DRAWINGS

Example embodiments of the present inventive concept will become more apparent by describing in detail example embodiments of the present inventive concept with reference to the accompanying drawings, in which.

DESCRIPTION OF EXAMPLE EMBODIMENTS

The present inventive concept may include a variety of modifications and a plurality of embodiments, and particular embodiments will be illustrated in the drawings and described herein in detail. However, it should be understood that the present inventive concept is not limited to the particular embodiments and includes all modifications, equivalents, and substitutes which are included in the concept and technical scope of the present inventive concept. In description of the present inventive concept, detailed description of well-known arts related to the present inventive concept will be omitted when it is deemed to unnecessarily obscure the essentials of the present inventive concept.

Hereinafter, the embodiments according to the present inventive concept will be described in detail with reference to the attached drawings. In description with reference to the attached drawings, like or corresponding elements will be referred to with like reference numerals and a detailed description thereof will be omitted.

A pipe vibration-proof channel according to the present inventive concept is used for supporting a wire or pipe connected to a facility, equipment, and the like of industrial facilities and is fixedly installed on a structural section steel member such as an H-beam or an I-beam. Particularly, the pipe vibration-proof channel of the present inventive concept includes a vibration-proof member and suppresses transferring of vibration generated in a pipe. Generally, in a support structure of an industrial facility which uses a structural section steel member, when vibration occurs, the vibration is easily transferred through mutually connected metal structures. That is, vibration generated in a wire or pipe is transferred to another facility along a structural section steel member which is formed of a metal. Additionally, in industrial facilities in which a plurality of microprocesses such as a semiconductor manufacturing processes are performed, micro vibrations may have an influence on a final product. When a pipe is damaged due to vibrations, toxic fumes used in processes may be released into the outside air and may result in a fatal accident. Accordingly, the present inventive concept provides a vibration-proof channel capable of preventing vibration generated in a wire or pipe from being transferred to the outside.

Figure 2:
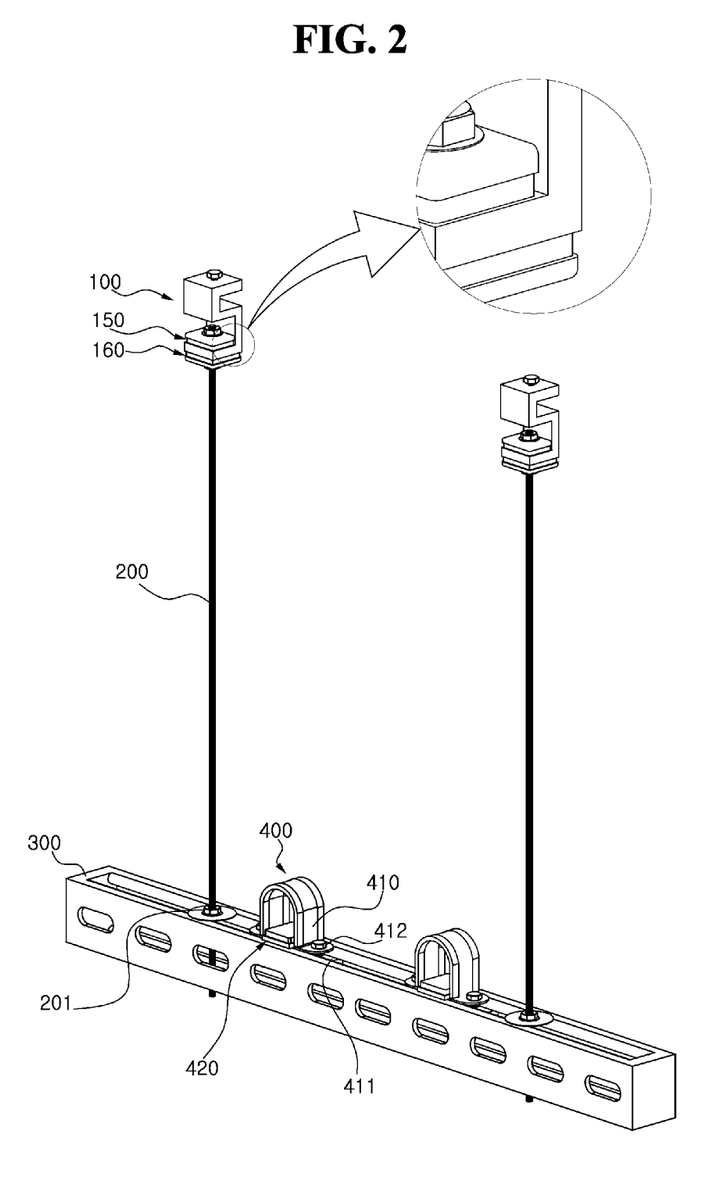
FIG. 2 is a view illustrating a pipe vibration-proof channel according to a first embodiment of the present inventive concept.

FIG. 2 is a view illustrating a pipe vibration-proof channel according to a first embodiment of the present inventive concept.

Figure 3:
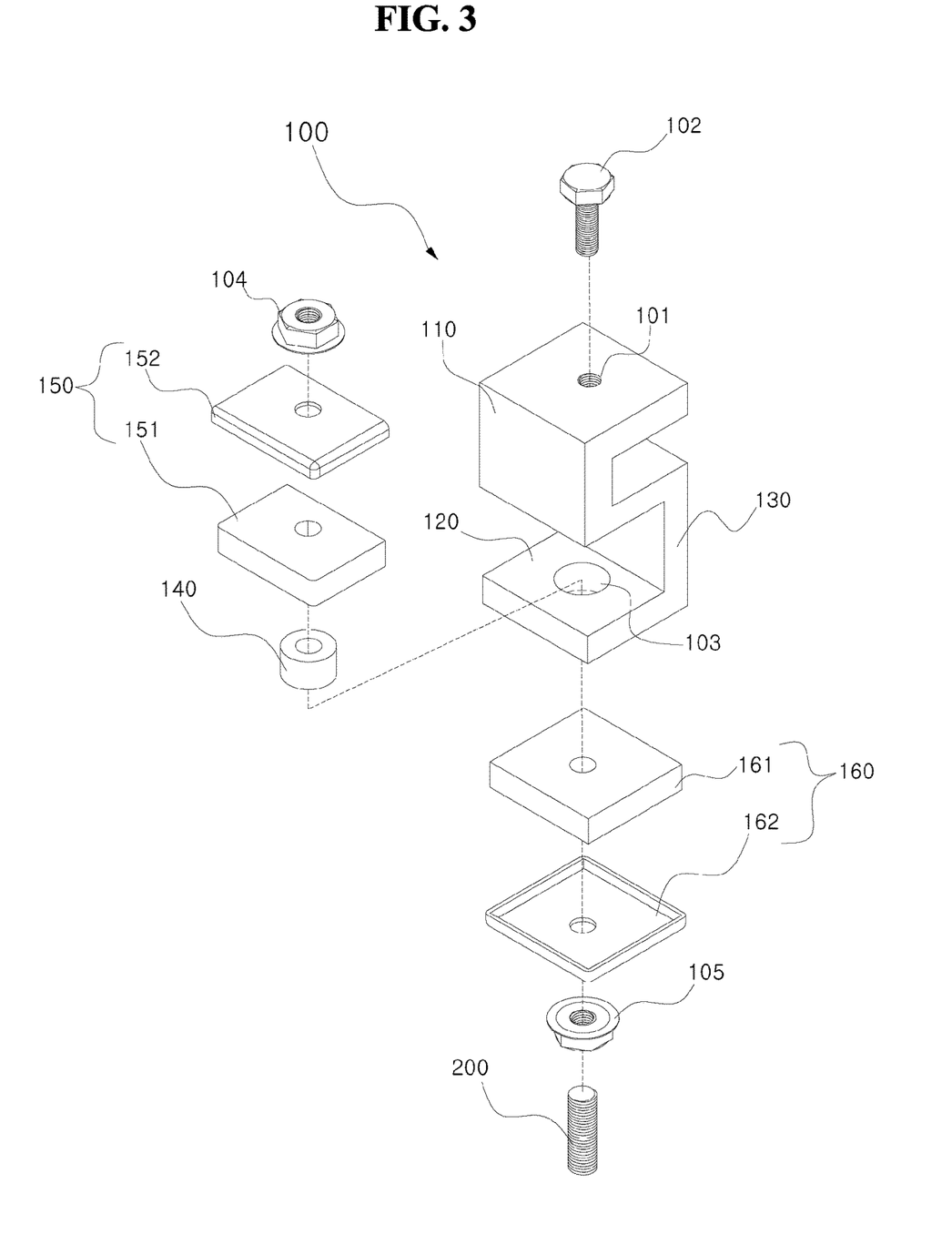
FIG. 3 is an exploded view illustrating a vibration-proof bracket according to the first embodiment of the present inventive concept.

FIG. 3 is an exploded view illustrating a vibration-proof bracket according to the first embodiment of the present inventive concept.

Referring to FIGS. 2 and 3, the pipe vibration-proof channel according to the first embodiment of the present inventive concept includes a vibration-proof bracket 100, a vertical channel 200, a horizontal channel 300, and a pipe fixing portion 400.

The vibration-proof bracket 100 may be an element configured to combine the vibration-proof channel of the present inventive concept with a structural section steel member H. That is, one end of the vibration-proof bracket 100 may be coupled to a flange portion of the structural section steel member H and the other end thereof may be connected to the vertical channel 200. Here, the structural section steel member H may be a structural section steel member H including a flange portion such as an H-beam or an I-beam but is not limited thereto.

Also, the vibration-proof bracket 100 may include a fixing portion 110 coupled to the structural section steel member H, a connection portion 120 disposed apart from the fixing portion 110 and with which the vertical channel 200 is coupled, and an extension portion 130 formed to extend from the fixing portion 110 to the connection portion 120.

The fixing portion 110 may include one end of the vibration-proof bracket 100. As an example, the fixing portion 110 may have a staple shape to be coupled to the flange portion of the structural section steel member H. That is, since the fixing portion 110 is coupled to the flange portion of the structural section steel member H and then a fixing bolt 102 is inserted into a fastening hole 101 formed in one end of the vibration-proof bracket 100, the vibration-proof bracket 100 may be fixed to the structural section steel member H. As an example, a screw thread may be formed inside the fastening hole 101 to fix the vibration-proof bracket 100 to the structural section steel member H through coupling with the fixing bolt 102.

The connection portion 120 may include the other end of the vibration-proof bracket 100. The connection portion 120 may include an insertion hole 103 to allow the vertical channel 200 to be inserted therein. That is, the vertical channel 200 is inserted into the insertion hole 103 formed in the connection portion 120 and then nuts 104 and 105 are fastened to the vertical channel 200 inserted in the insertion hole 103 to fix the vertical channel 200 to the vibration-proof bracket 100.

However, a packing 140 may be disposed in the insertion hole 103 of the connection portion 120. The packing 140 may be formed, for example, of an elastic rubber material to absorb vibration of the pipe 1 which is transferred through the vertical channel 200. That is, since the vertical channel 200 and the vibration-proof bracket 100 are formed of metal materials, the vibration generated in the pipe 1 caused by contact between the metals may be transferred to the vibration-proof bracket 100 through the vertical channel 200. Accordingly, the packing 140 formed of an elastic rubber material is inserted into a part where the vertical channel 200 and the vibration-proof bracket 100 come into contact with each other to block the vibration transferred through the vertical channel 200.

The extension portion 130 may be disposed between the fixing portion 110 and the connection portion 120 to extend to the connection portion 120 from the fixing portion 110. In detail, the extension portion 130 may be formed so that one end comes into contact with the fixing portion 110 and the other end comes into contact with the connection portion 120. As an example, the vibration-proof bracket 100 may be integrally formed to include the fixing portion 110, the extension portion 130, and the connection portion 120. Also, the vibration-proof bracket 100 may have an S shape as shown in FIG. 3 due to the shapes of the fixing portion 110, the extension portion 130, and the connection portion 120.

Accordingly, the fixing portion 110 fixed to the structural section steel member H by the extension portion 130 may be disposed apart from the connection portion 120 to which the vertical channel 200 is connected. Due to the connection portion 120 spaced apart from the fixing portion 110, the vertical channel 200 may be disposed apart from the structural section steel member H.

In a conventional pipe channel, since both the structural section steel member H and the vertical channel 200 are connected to a fixing part of the bracket 10 fixed to the structural section steel member H, vibration generated in the pipe 1 may be transferred to the structural section steel member H through the vertical channel 200. However, the vibration-proof bracket 100 according to the present inventive concept may block the vibration generated in the pipe 1 from being transferred to the structural section steel member H by spacing the structural section steel member H and the vertical channel 200 apart from each other by spacing a part 110 of the vibration-proof bracket 100 fixed to the structural section steel member H apart from a part 120 of the vibration-proof bracket 100 to which the vertical channel 200 is connected.

Also, a first vibration-proof unit 150 and a second vibration-proof unit 160 may be disposed on an upper surface and a lower surface of the connection portion 120, respectively. The first vibration-proof unit 150 and the second vibration-proof unit 160 have a function of preventing the vibration of the pipe 1 which is transferred through the vertical channel 200 from being transferred to the vibration-proof bracket 100 through the nuts 105 and 106 which fix the vertical channel 200. That is, the vibration of the pipe 1 which is transferred through the vertical channel 200 may be prevented from being transferred to the vibration-proof bracket 100.

The first vibration-proof unit 150 may be disposed above the connection portion 120 of the vibration-proof bracket 100. Also, the first vibration-proof unit 150 may include a first vibration-proof member 151 and a first vibration-proof block 152.

The first vibration-proof member 151 may be disposed in contact with the upper surface of the connection portion 120. As an example, the first vibration-proof member 151 may be formed, for example, of an elastic rubber material to absorb the vibration of the pipe 1 which is transferred through the vertical channel 200.

The first vibration-proof block 152 may be disposed to cover an upper surface of the first vibration-proof member 151. The first vibration-proof block 152 may pressurize the first vibration-proof member 151 to fix the first vibration-proof member 151 to the connection portion 120. That is, the vertical channel 200 may be inserted through fastening holes formed in the first vibration-proof member 151 and the first vibration-proof block 152. Here, the first vibration-proof block 152 may pressurize the first vibration-proof member 151 due to an upper nut 104 mounted to fix the inserted vertical channel 200. The first vibration-proof block 152 may be allowed to pressurize the first vibration-proof member 151 with a larger area than the upper nut 104 to prevent the first vibration-proof member 151 from being damaged by the upper nut 104. Also, due to the first vibration-proof member 151, the vibration of the pipe 1 which is transferred to the upper nut 104 through the vertical channel 200 may be prevented from being transferred to the vibration-proof bracket 100.

However, the first vibration-proof unit 150 may be disposed above the connection portion 120 while spaced at a certain distance from the extension portion 130. This is to prevent the vibration of the pipe 1 transferred through the upper nut 104 from being transferred to the extension portion 130 along the first vibration-proof block 152 due to the first vibration-proof block 152 which is formed of a metal material and comes into contact with the extension portion 130.

The second vibration-proof unit 160 may be disposed on the lower surface of the connection portion 120 of the vibration-proof bracket 100. Also, the second vibration-proof unit 160 may include a second vibration-proof member 161 and a second vibration-proof block 162.

The second vibration-proof member 161 may be disposed in contact with the lower surface of the connection portion 120. As an example, the second vibration-proof member 161 may be formed, for example, of an elastic rubber material to absorb the vibration of the pipe 1 which is transferred through the vertical channel 200.

The second vibration-proof block 162 may be disposed to cover a lower surface of the second vibration-proof member 161. The second vibration-proof block 162 may pressurize the second vibration-proof member 161 to fix the second vibration-proof member 161 to the connection portion 120. That is, the vertical channel 200 may be inserted through fastening holes formed in the second vibration-proof member 161 and the second vibration-proof block 162. Here, the second vibration-proof block 162 may pressurize the second vibration-proof member 161 due to a lower nut 105 mounted to fix the inserted vertical channel 200. The second vibration-proof block 162 may be allowed to pressurize the second vibration-proof member 161 with a larger area than the lower nut 105 to prevent the second vibration-proof member 161 from being damaged by the lower nut 105. Also, due to the second vibration-proof member 161, the vibration of the pipe 1 which is transferred to the lower nut 105 through the vertical channel 200 may be prevented from being transferred to the vibration-proof bracket 100.

Consecutively, one end of the vertical channel 200 may be connected to the vibration-proof bracket 100 and the other end may be connected to the horizontal channel 300. As an example, the vertical channel 200 may be a full-threaded bolt having a screw thread on the whole body. Accordingly, the one end and the other end of the vertical channel 200 may be fixed to the vibration-proof bracket 100 and the horizontal channel 300 using nuts, respectively.

Also, two or more vertical channels 200 may be installed at certain intervals to be parallel to each other. As an example, in the case of two vertical channels 200 installed at a certain interval, the vibration-proof bracket 100 may be connected to each of one ends thereof and the other ends thereof may be connected to both sides of the horizontal channel 300.

The horizontal channel 300 may be connected to the other end of the vertical channel 200. That is, one end and the other end of the horizontal channel 300 may be connected to the other ends of the vertical channels 200 which are spaced a certain interval from each other. The horizontal channel 300 may be fixed to the vertical channel 200 using a fixing nut 201 coupled to the other end of the vertical channel 200. As an example, since the pipe 1 may be disposed above the horizontal channel 300, the pipe 1 may be disposed above the ground with a height.

Also, the pipe 1 may be disposed above the horizontal channel 300 and fixed to the horizontal channel 300 using the pipe fixing portion 400.

Figure 4:
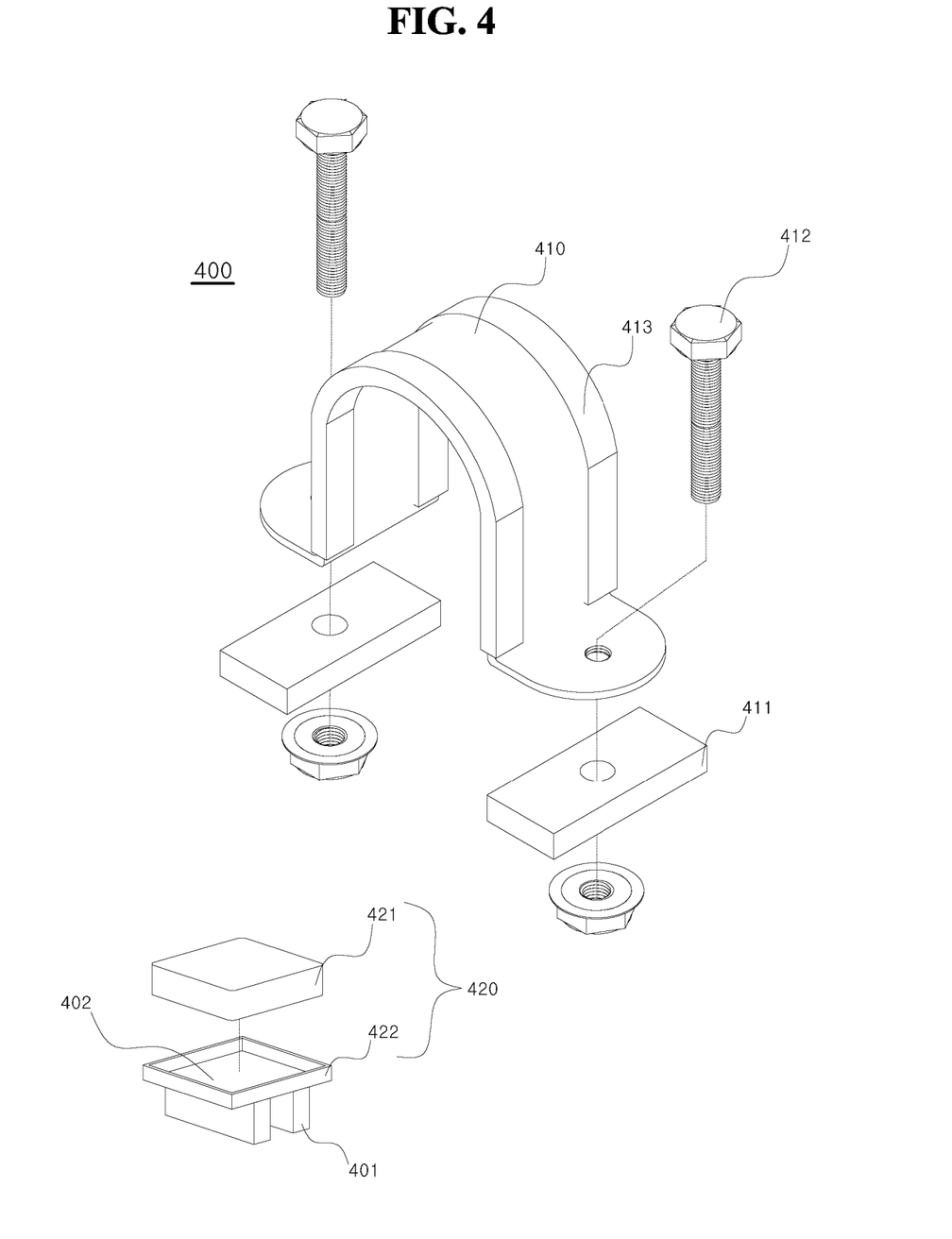
FIG. 4 is an exploded view illustrating a pipe fixing portion according to the present inventive concept.

FIG. 4 is an exploded view illustrating the pipe fixing portion according to the present inventive concept.

Referring to FIG. 4, the pipe fixing portion 400 may be formed to surround the pipe 1 and may be fixed to the horizontal channel 300. Also, the pipe fixing portion 400 may include a pipe bracket 410 and a third vibration-proof unit 420.

The pipe bracket 410 may have a U-shape to surround the pipe 1. However, a size of the pipe bracket 410 may vary according to a size of a wire or the pipe 1. The pipe bracket 410 may include a fixing block 411 and a fixing bolt 412, which are configured to fix the pipe bracket 410 to the horizontal channel 300, on one end and the other end thereof, respectively.

Also, the pipe bracket 410 may include a buffer portion 413, which is formed to surround the pipe bracket 410, on a body. Accordingly, when the pipe 1 is fixed using the pipe bracket 410, the pipe 1 may be disposed in contact with the buffer portion 413 to allow the vibration generated in the pipe 1 to be well absorbed by the buffer portion 413.

The third vibration-proof unit 420 may be disposed between the pipe 1 and the horizontal channel 300 so that the pipe 1 and the horizontal channel 300 on which the pipe 1 is seated are spaced apart from each other. The third vibration-proof unit 420 may prevent the vibration generated in the pipe 1 from being directly transferred to the horizontal channel 300.

Also, the third vibration-proof unit 420 may include a third vibration-proof member 421 and a third vibration-proof block 422.

The third vibration-proof member 421 may be disposed in contact with a lower surface of the pipe 1. As an example, the third vibration-proof member 421 may be formed, for example, of an elastic rubber material to absorb the vibration of the pipe 1.

The third vibration-proof block 422 may be disposed above the horizontal channel 300. That is, the third vibration-proof member 421 may be seated above the third vibration-proof block 422, and the third vibration-proof block 422 on which the third vibration-proof member 421 is seated may be disposed above the horizontal channel 300. A protruding portion 401 may be provided to fix a lower surface of the third vibration-proof member 421 to the third horizontal channel 300 when the third vibration-proof member 421 is disposed on the horizontal channel 300.

Also, an upper surface of the third vibration-proof block 422 may include a seat groove 402 to allow the third vibration-proof member 421 to be inserted and seated there. The seat groove 402 may have the same shape as the third vibration-proof member 421 and may be formed to have the same size as the third vibration-proof member 421 to allow the third vibration-proof member 421 to be inserted and fixed.

However, when the third vibration-proof member 421 is inserted into and seated on the seat groove 402, the third vibration-proof member 421 may be disposed to protrude from the third vibration-proof block 422. This is to prevent the third vibration-proof block 422 formed of a metal material from coming into contact with the pipe 1.

Accordingly, since the pipe 1 is disposed on the horizontal channel 300 while surrounded with an elastic material due to the pipe bracket 410 and the third vibration-proof unit 420, the vibration generated in the pipe 1 may be prevented from being transferred to the horizontal channel 300.

Figure 5:
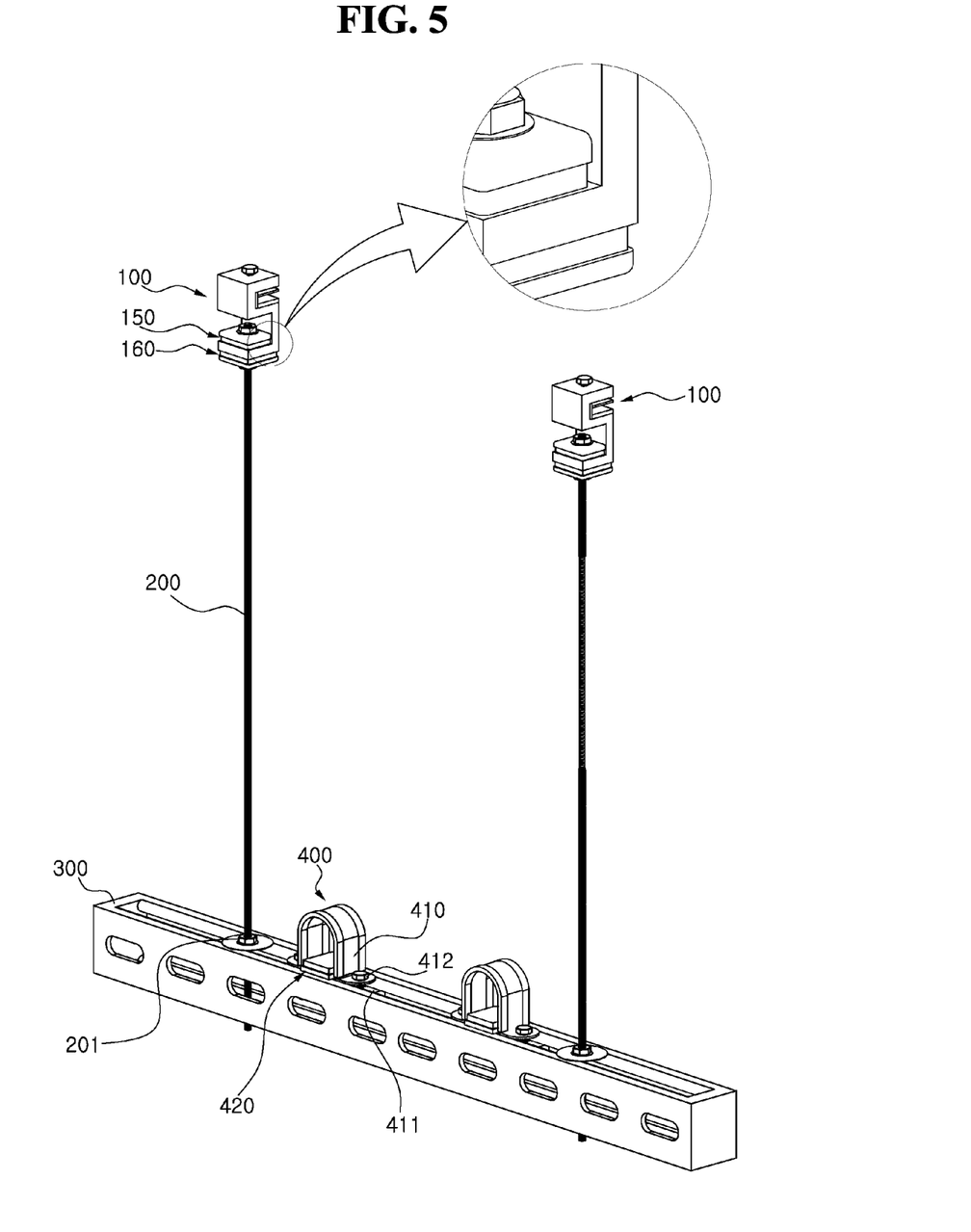
FIG. 5 is a view illustrating a pipe vibration-proof channel according to a second embodiment of the present inventive concept.

FIG. 5 is a view illustrating a pipe vibration-proof channel according to a second embodiment of the present inventive concept.

Figure 6:
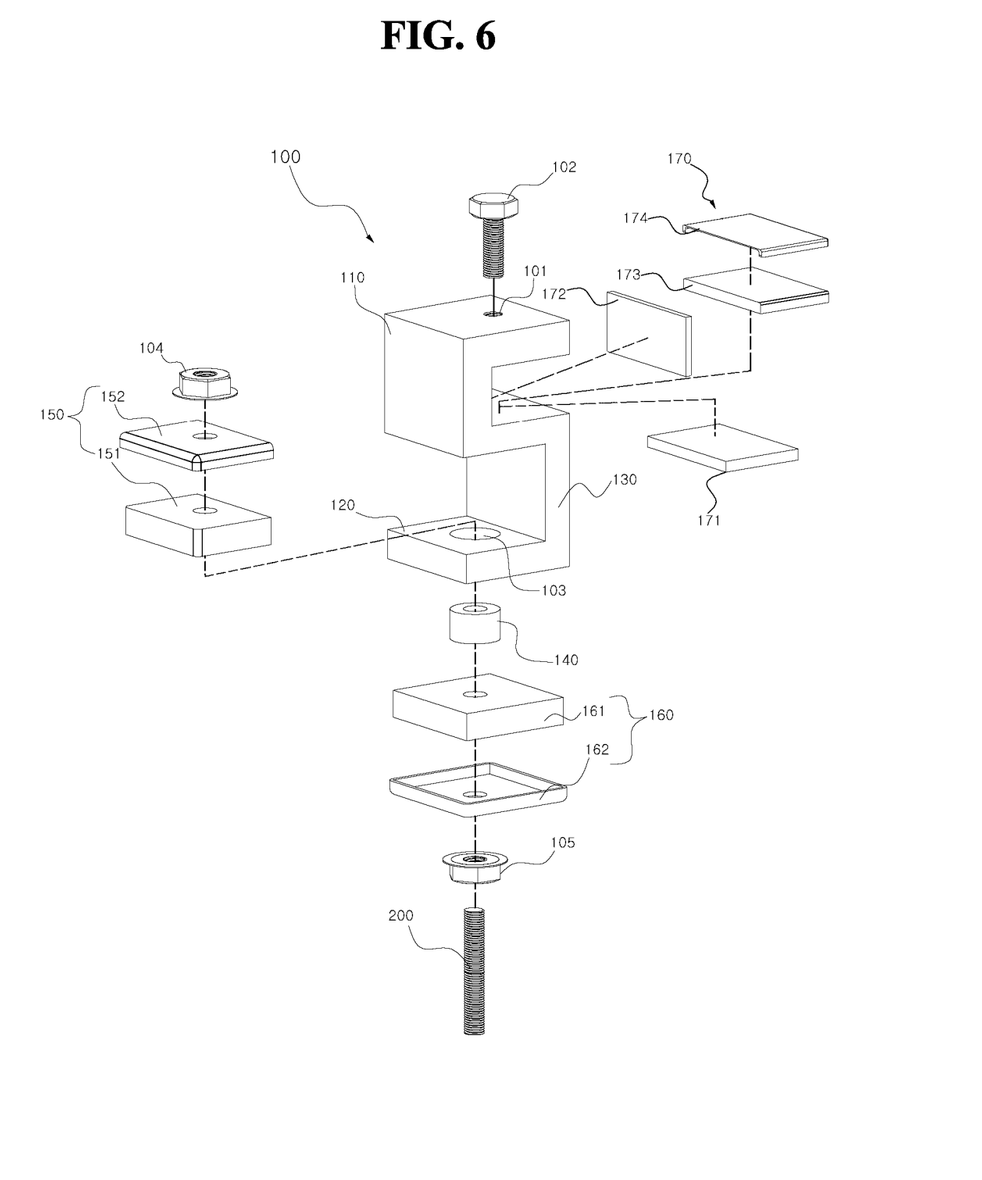
FIG. 6 is an exploded view illustrating a vibration-proof bracket according to the second embodiment of the present inventive concept.

FIG. 6 is an exploded view illustrating a vibration-proof bracket according to the second embodiment of the present inventive concept.

Referring to FIGS. 5 and 6, the pipe vibration-proof channel according to the second embodiment of the present inventive concept includes a vibration-proof bracket 100, a vertical channel 200, a horizontal channel 300, and a pipe fixing portion 400. Here, the vertical channel 200, the horizontal channel 300, and the pipe fixing portion 400 have the same configuration as those of the first embodiment.

However, the pipe vibration-proof channel according to the second embodiment may further include a fourth vibration-proof unit 170 disposed on a part where the vibration-proof bracket 100 and a structural section steel member H are coupled to each other.

The fourth vibration-proof unit 170 has a function of preventing residual vibration from being transferred to the structural section steel member H through the vibration-proof bracket 100. That is, vibration transferred through the vertical channel 200 may be blocked using the vibration-proof bracket 100, and residual vibration transferred to the vibration-proof bracket 100 may be blocked using the fourth vibration-proof unit 170.

The fourth vibration-proof unit 170 may be disposed on a part where a fixing portion 110 of the vibration-proof bracket 100 is coupled to the structural section steel member H and include a fourth vibration-proof member 171, a fifth vibration-proof member 172, a sixth vibration-proof member 173, and a fourth vibration-proof block 174.

The fourth vibration-proof member 171, the fifth vibration-proof member 172, and the sixth vibration-proof member 173 may be disposed between the fixing portion 110 and a lower surface, a side surface, and an upper surface of the structural section steel member H. The fourth vibration-proof member 171, the fifth vibration-proof member 172, and the sixth vibration-proof member 173 may be formed of elastic rubber materials and disposed to allow the structural section steel member H and the fixing portion 110 to be spaced apart from each other. That is, since it is possible to prevent the structural section steel member H formed of a metal and the fixing portion 110 from coming into direct contact with each other using the fourth vibration-proof member 171, the fifth vibration-proof member 172, and the sixth vibration-proof member 173, the residual vibration may be prevented from being transferred to the structural section steel member H through the vibration-proof bracket 100.

The fourth vibration-proof block 174 may be disposed to cover an upper surface of the sixth vibration-proof member 173. The fourth vibration-proof block 174 may be pressurized downward by coupling with a fixing bolt 102 configured to fix the vibration-proof bracket 100. That is, the fixing bolt 102 may pressurize an upper surface of the fourth vibration-proof block 174 due to coupling with the vibration-proof bracket 100. Accordingly, the fourth vibration-proof member 171, the fifth vibration-proof member 172, and the sixth vibration-proof member 173 may be fixed between the structural section steel member H and the fixing portion 110 due to a pressurizing force of the fixing bolt 102 which pressurizes the fourth vibration-proof block 174. Also, since it is possible to prevent the fixing bolt 102 from coming into contact with the structural section steel member H using the sixth vibration-proof member 173, the residual vibration may be prevented from being transferred to the structural section steel member H through the fixing bolt 102.

Figure 7:
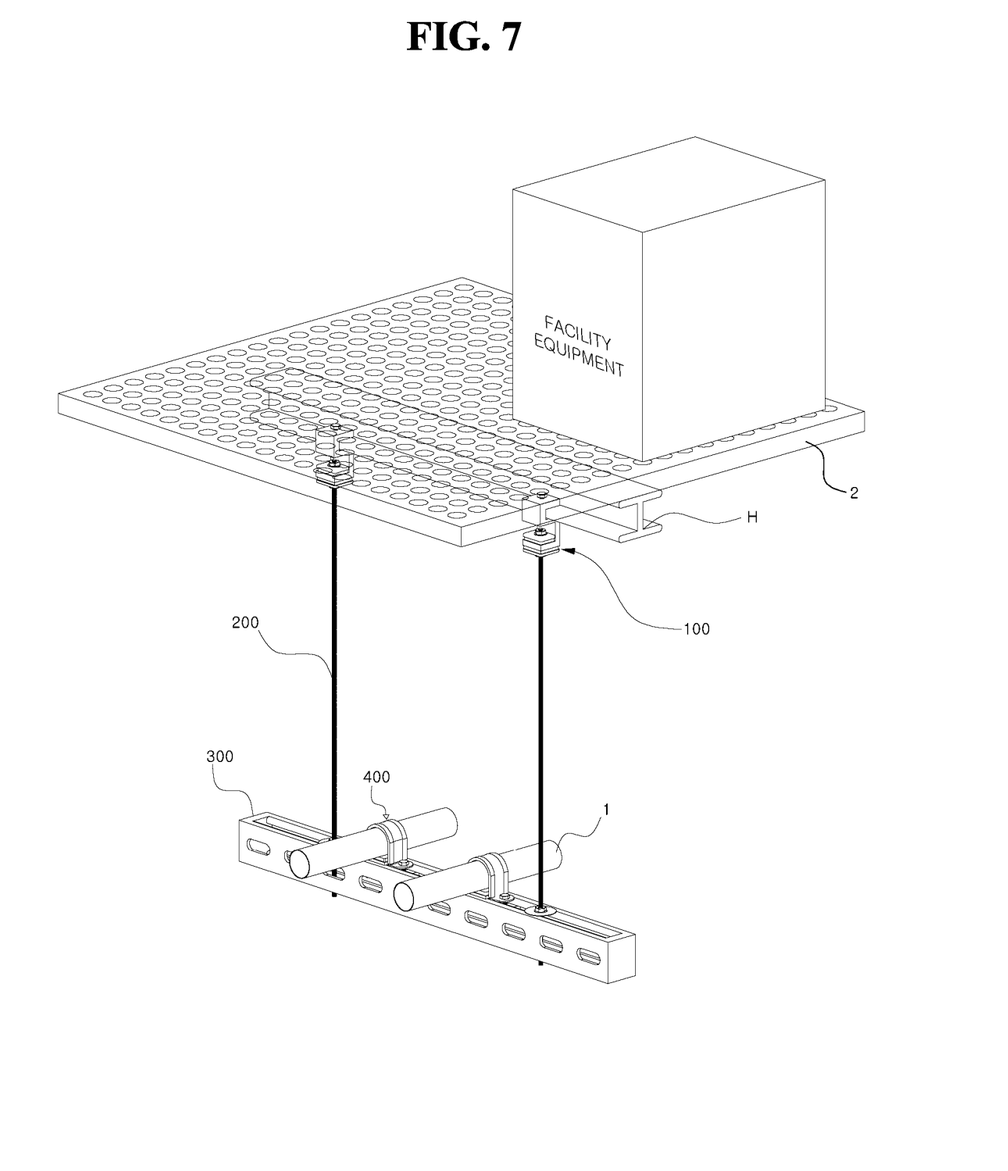
FIG. 7 is a view illustrating the pipe vibration-proof channel according to the first embodiment of the present inventive concept installed in a structural section steel member.

FIG. 7 is a view illustrating the pipe vibration-proof channel according to the first embodiment of the present inventive concept installed in the structural section steel member.

Referring to FIG. 7, the structural section steel member H is disposed below a grating, and the pipe vibration-proof channel of the present inventive concept is connected to the structural section steel member H using the vibration-proof bracket 100. The pipe 1 is fixedly disposed above the horizontal channel 300 using the pipe fixing portion 400. Accordingly, the vibration generated in the pipe 1 may be absorbed by the pipe fixing portion 400, and the vibration-proof bracket 100 may prevent the vibration transferred through the vertical channel 200 from being transferred to the outside. That is, since the vertical channel 200 is connected to the vibration-proof bracket 100 to be separated from the structural section steel member H, it is possible to prevent vibration from being transferred from the vertical channel 200 to the structural section steel member H. Accordingly, there is an effect of blocking the vibration generated in the pipe 1 from being transferred to a grating 2 on which a plurality of facilities are disposed.

Figure 8:
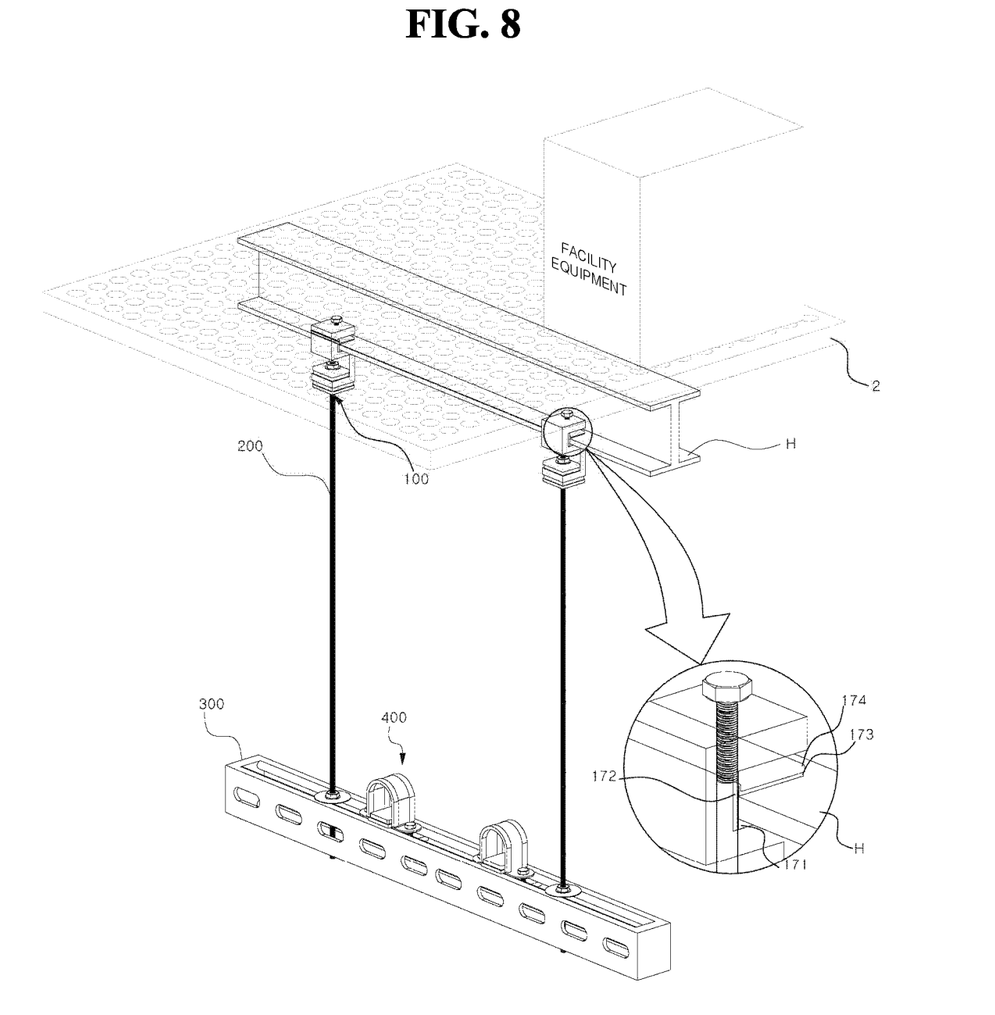
FIG. 8 is a view illustrating the pipe vibration-proof channel according to the second embodiment of the present inventive concept installed in a structural section steel member.

FIG. 8 is a view illustrating the pipe vibration-proof channel according to the second embodiment of the present inventive concept installed in the structural section steel member.

Referring to FIG. 8, the pipe vibration-proof channel is connected to the structural section steel member H using the vibration-proof bracket 100 while the vibration-proof bracket 100 is coupled to the structural section steel member H using the fourth vibration-proof unit 170. That is, the vibration-proof bracket 100 may be fixedly mounted on the structural section steel member H and the vibration-proof bracket 100 may be disposed apart from the structural section steel member H due to the fourth vibration-proof member 171, the fifth vibration-proof member 172, and the sixth vibration-proof member 173. Accordingly, there is an effect of not only blocking vibration transferred through the vertical channel 200 using the vibration-proof bracket 100 but also blocking residual vibration transferred to the vibration-proof bracket 100 using the fourth vibration-proof unit 170.

Table 1 shows a result of measuring and comparing vibration transferred from a pipe to a structural section steel member H. Comparison targets are a conventional pipe vibration-proof channel, the pipe vibration-proof channel according to the first embodiment of the present inventive concept, and the pipe vibration-proof channel according to the second embodiment of the present inventive concept, and vibration generated in the pipe and vibration transferred to the structural section steel member H are measured.

TABLE 1

| Classification | Conventional pipe vibration-proof channel | Pipe vibration-proof channel according to first embodiment | | Pipe vibration-proof channel according to second embodiment | |
|---|---|---|---|---|---|
| | Vibration data (mm/s RMS) | Vibration data (mm/s RMS) | Reduction rate (%) | Vibration data (mm/s RMS) | Reduction rate (%) |
| Measurement results | 33 | 15.5 | 53 | 12.1 | 63 |

Referring to Table 1, in the case of the conventional vibration-proof channel, vibration of 33 mm/s root-mean-square (RMS) is measured at the structural section steel member H. On the other hand, when the pipe vibration-proof channel according to the first embodiment is applied, vibration of 15.5 mm/s RMS is measured and it can be seen that vibration is reduced by 53% in comparison to the conventional pipe vibration-proof channel. Also, when the pipe vibration-proof channel according to the second embodiment is applied, vibration of 12.1 mm/s RMS is measured and it can be seen that vibration is reduced by 63% in comparison to the conventional pipe vibration-proof channel.

As described above, in the pipe vibration-proof channel according to the present inventive concept, since the vertical channel 200 connected to the horizontal channel 300 on which the pipe 1 is disposed is disposed to be separated from the structural section steel member H, it is possible to prevent the vibration generated in the pipe 1 from being transferred to the structural section steel member H. Also, since the vibration-proof units 140, 150, and 160 configured to absorb vibration are arranged in the fastening hole and above and below the vibration-proof bracket 100 to which the vertical channel 200 is connected, it is possible to prevent the vibration generated in the pipe 1 from being transferred to the vibration-proof bracket 100. In addition, since the vibration-proof unit 170 is disposed on a part where the vibration-proof bracket 100 and the structural section steel member H are coupled to each other, it is possible to prevent residual vibration of the vibration-proof bracket 100 from being transferred to the structural section steel member H.

According to the present inventive concept, since a vertical channel connected to a horizontal channel on which a pipe is disposed is disposed to be separated from a structural section steel member, it is possible to prevent the vibration generated in the pipe from being transferred to the structural section steel member.

Also, since vibration-proof units capable of absorbing vibration are disposed in a fastening hole and above and below a vibration-proof bracket to which the vertical channel is connected, it is possible to prevent the vibration generated in the pipe from being transferred to the vibration-proof bracket.

In addition, since a vibration-proof unit is disposed on a part where the vibration-proof bracket and the structural section steel member are coupled, it is possible to prevent residual vibration of the vibration-proof bracket from being transferred to the structural section steel member.

In addition, since a vibration-proof unit is disposed between a pipe bracket configured to fix the pipe and a horizontal channel on which the pipe is seated, it is possible to prevent the vibration of the pipe from being transferred to a pipe channel.

The technical effects of the present inventive concept are not limited to the above effects, and other unstated technical effects will be clearly understood by those skilled in the art from the description.

Meanwhile, the embodiments disclosed in the specification and drawings are merely particular examples for helping understanding and are not intended to restrict the scope of the present inventive concept. It is apparent to those of ordinary skill in the art that a variety of modifications based on the technical concept of the present inventive concept can be made in addition to the embodiments disclosed herein.

What is claimed is:

1. A pipe vibration-proof channel comprising:
   a plurality of vibration-proof brackets coupled to a flange portion of a structural section steel member;
   a horizontal channel disposed apart from the plurality of vibration-proof brackets;
   a plurality of vertical channels each having one end connected to a respective one of the plurality of vibration-proof brackets and another end connected to the horizontal channel;
   a pipe fixing portion disposed above the horizontal channel to fix a pipe thereto;
   wherein the vertical channel is connected to the vibration-proof bracket to be separated from the structural section steel member,
   wherein the vibration-proof bracket comprises:
      a fixing portion coupled to the structural section steel member;
      a connection portion disposed apart from the fixing portion and to which the vertical channel is coupled; and
      an extension portion formed to extend to the connection portion from the fixing portion;
   wherein the pipe vibration-proof channel further comprises:
      a first vibration-proof unit disposed above the connection portion;
      a second vibration-proof unit disposed below the connection portion; and
      a packing disposed at a part where the connection portion and the vertical channel are coupled to each other, and
   wherein the first vibration-proof unit comprises:
      a first vibration-proof member disposed in contact with an upper surface of the connection portion; and
      a first vibration-proof block disposed to surround an upper surface of the first vibration-proof member and to be spaced apart from the extension portion.

2. The pipe vibration-proof channel of claim 1, wherein the second vibration-proof unit comprises:
   a second vibration-proof member disposed in contact with a lower surface of the connection portion; and
   a second vibration-proof block disposed to surround a lower surface of the second vibration-proof member.

3. The pipe vibration-proof channel of claim 1, wherein one end of the vertical channel is connected to the connection portion, and the connected one end of the vertical channel is disposed apart from the fixing portion.

4. The pipe vibration-proof channel of claim 1, wherein the pipe fixing portion comprises:
   a pipe bracket disposed to surround the pipe and fixed to the horizontal channel; and
   a third vibration-proof unit disposed between the pipe and the horizontal channel to allow the pipe and the horizontal channel to be spaced apart from each other.

5. The pipe vibration-proof channel of claim 4, wherein the pipe bracket further comprises a buffer portion formed in contact with an outer circumferential surface of the pipe.

6. The pipe vibration-proof channel of claim 4, wherein the third vibration-proof unit comprises:
   a third vibration-proof member on which the pipe is seated; and
   a third vibration-proof block disposed above the horizontal channel and comprising a seat groove on which the third vibration-proof member is seated.

7. The pipe vibration-proof channel of claim 1, further comprising a fourth vibration-proof unit disposed on a part where the structural section steel member and the fixing portion are coupled.

8. The pipe vibration-proof channel of claim 7, wherein the fourth vibration-proof unit comprises:
   a fourth vibration-proof member disposed between a lower surface of the structural section steel member and the fixing portion;
   a fifth vibration-proof member disposed between a side surface of the structural section steel member and the fixing portion;
   a sixth vibration-proof member disposed between an upper surface of the structural section steel member and the fixing portion; and
   a fourth vibration-proof block disposed to surround an upper surface of the fifth vibration-proof member.

9. The pipe vibration-proof channel of claim 8, wherein the fourth vibration-proof block pressurizes the sixth vibration-proof member due to a fixing bolt configured to fix the fixing portion.

* * * * *